(12) United States Patent
Keegan et al.

(10) Patent No.: US 9,573,843 B2
(45) Date of Patent: Feb. 21, 2017

(54) POLYMER EDGE-COVERED GLASS ARTICLES AND METHODS FOR MAKING AND USING SAME

(71) Applicant: CORNING INCORPORATED, Corning, NY (US)

(72) Inventors: Kimberly Michelle Keegan, Corning, NY (US); Nagaraja Shashidhar, Painted Post, NY (US); Paul John Shustack, Elmira, NY (US); Kevin Andrew Vasilakos, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 92 days.

(21) Appl. No.: 14/446,928

(22) Filed: Jul. 30, 2014

(65) Prior Publication Data
US 2015/0037543 A1 Feb. 5, 2015

Related U.S. Application Data

(60) Provisional application No. 61/862,316, filed on Aug. 5, 2013.

(51) Int. Cl.
*B32B 3/10* (2006.01)
*C03C 17/32* (2006.01)
(Continued)

(52) U.S. Cl.
CPC .......... *C03C 17/32* (2013.01); *C03C 17/3405* (2013.01); *C03C 17/42* (2013.01);
(Continued)

(58) Field of Classification Search
None
See application file for complete search history.

(56) References Cited

U.S. PATENT DOCUMENTS 3,986,997 A 10/1976 Clark ...................... 260/29.2 M
4,929,294 A 5/1990 Blome .......................... 156/187
(Continued)

FOREIGN PATENT DOCUMENTS

JP 61-291214 12/1986
JP 1-281907 11/1989
(Continued)

OTHER PUBLICATIONS

Patent Cooperation Treaty International Notification of Transmittal of the International Search Report and The Written Opinion of the International Searching Authority, international application No. PCT/US2014/049000; mailing date Dec. 23, 2014, 11 pages.
(Continued)

*Primary Examiner* — Christopher Polley
(74) *Attorney, Agent, or Firm* — John T. Haran

(57) ABSTRACT

Described herein are various polymer-covered glass and glass-ceramic articles that exhibit improved adhesion between the polymer and the glass or glass-ceramic, along with methods for their manufacture and use. The improved articles generally include a glass or glass-ceramic substrate, a surface-roughened coating disposed on at least a portion of an edge of the glass or glass-ceramic substrate, and a polymer covering disposed on at least a portion of the surface-roughened coating. The surface-roughened coatings beneficially allow the polymer coverings to adhere better to the edge surfaces of the glass or glass-ceramic substrates relative to similar or identical articles that lack the surface-roughened coating.

16 Claims, 2 Drawing Sheets

(51) Int. Cl.
*C03C 17/34* (2006.01)
*C03C 17/42* (2006.01)

(52) U.S. Cl.
CPC .... *C03C 2217/445* (2013.01); *C03C 2217/47* (2013.01); *C03C 2217/475* (2013.01); *C03C 2217/478* (2013.01); *C03C 2217/48* (2013.01); *C03C 2217/77* (2013.01); *C03C 2218/152* (2013.01); *Y10T 428/24777* (2015.01)

(56) References Cited

U.S. PATENT DOCUMENTS

| | | | |
|---|---|---|---|
| 5,324,566 A | 6/1994 | Ogawa et al. | 428/141 |
| 7,604,863 B2 | 10/2009 | Yamauchi et al. | 428/415 |
| 7,658,968 B2 | 2/2010 | Otter | 427/204 |
| 8,119,048 B2 | 2/2012 | Nishimura | 264/252 |
| 8,263,211 B2 | 9/2012 | Nishimura | 428/194 |
| 8,586,492 B2 | 11/2013 | Barefoot et al. | 501/66 |
| 8,765,262 B2 | 7/2014 | Gross | 428/410 |
| 2008/0199618 A1* | 8/2008 | Wen | C03C 17/007 427/299 |
| 2009/0142568 A1 | 6/2009 | Dejneka et al. | 428/220 |
| 2009/0241317 A1* | 10/2009 | Kubler | B65D 81/053 29/428 |
| 2012/0040146 A1 | 2/2012 | Garner et al. | 428/192 |
| 2012/0118628 A1 | 5/2012 | Pakula et al. | 174/520 |
| 2012/0135226 A1 | 5/2012 | Bookbinder et al. | 428/335 |
| 2013/0264741 A1 | 10/2013 | Ookura et al. | 264/259 |
| 2014/0106172 A1 | 4/2014 | Dejneka et al. | 428/410 |
| 2014/0220310 A1* | 8/2014 | Vogt | C03C 3/091 428/194 |

FOREIGN PATENT DOCUMENTS

| | | |
|---|---|---|
| JP | 3-099816 | 4/1991 |
| JP | 2002-079611 | 3/2002 |
| JP | 2003-277169 | 10/2003 |
| JP | 2008-037078 | 2/2008 |
| KR | 2009-055052 | 6/2009 |
| KR | 2009-073492 | 7/2009 |
| KR | 2012-120936 | 11/2012 |
| WO | 00/59990 | 10/2000 |
| WO | 02/082183 | 10/2002 |
| WO | 2005/032793 | 4/2005 |
| WO | 2009/046725 | 4/2009 |
| WO | 2010/129732 | 11/2010 |
| WO | 2010/132023 | 11/2010 |
| WO | 2012/060311 | 5/2012 |

OTHER PUBLICATIONS

Al-Sheyyab, Ahmad; Kuehnert, Ines; Schmachtenberg, Ernst, Annual Technical Conference—Society of Plastics Engineers (2007), 65th, 1000-1004.

Foster, Richard J.; Bonner, Mark J.; Ward, Ian M., Composites Science and Technology (2011), 71(4), 461-465.

Raia, David C., Annual Technical Conference—Society of Plastics Engineers (2011), 69th(vol. 3), 2527-2537.

Wang, Tie; Kang, E. T.; Neoh, K. G.; Tan, K. L., Materials Research Bulletin (1996), 31(11), 1361-1373.

Webb, D. Patrick; Hutt, David A.; Hopkinson, Neil; Conway, Paul P.; Palmer, Paul J., Journal of Microelectromechanical Systems (2009), 18(2), 354-362.

* cited by examiner

POLYMER EDGE-COVERED GLASS ARTICLES AND METHODS FOR MAKING AND USING SAME

CROSS-REFERENCE TO RELATED APPLICATIONS

This application claims the benefit of priority under 35 U.S.C. §119 of U.S. Provisional Application Ser. No. 61/862,316 filed on Aug. 5, 2013 the content of which is relied upon and incorporated herein by reference in its entirety.

TECHNICAL FIELD

The present disclosure relates generally to polymer coverings for glass or glass-ceramic articles. More particularly, the various embodiments described herein relate to glass or glass-ceramic articles having polymer coverings disposed on an edge thereof such that there is improved adhesion between the polymer covering and the glass or glass-ceramic article, as well as to methods of making and using the covered glass articles.

BACKGROUND

Methods of applying polymeric materials to glass surfaces have long been of interest for a variety of purposes. Such purposes have included the provision of bezels or frames, stain resistance, reflection- or glare-resistance, and impact absorbance or resistance, among others.

By virtue of their incompatibility, it traditionally has been difficult to apply certain types of polymers to glass surfaces in a manner that results in minimal to no delamination. To overcome these inherent difficulties, methods to improve the adhesion between polymers and glass have been developed. For example, some of these methods include the use of compatibilizing agents (e.g., primers, adhesion promoters, or coupling agents), adhesive laminates, or mechanical means. Even with the use of such methods, delamination of the polymer from the glass can occur.

By way of illustration, it is economically desirable to use injection molding to overmold glass articles with a polymer to fabricate outward-facing components of electronic devices (e.g., cell phones, televisions, laptop computers, tablets, and the like). For example, the overmolding process can be used to encase glass with an impact resistant polymer. This technique is not widely used, however, owing to insufficient adhesion between the polymer and the glass. The poor adhesion can result in delamination of the plastic from the glass over time, during use, or on impact with another object. When the polymer delaminates from the glass, the glass can be prone to breakage on impact such as would happen if the electronic device were to be bumped or dropped.

There accordingly remains a need for technologies that provide improved adhesion between polymers and glass surfaces. It would be particularly advantageous if such technologies did not adversely affect other desirable properties of the glass surfaces (e.g., transmission, haze, strength, scratch resistance, and the like). It is to the provision of such technologies that the present disclosure is directed.

BRIEF SUMMARY

Described herein are various articles that have improved adherence, along with methods for their manufacture and use.

One type of coated article can include a glass or glass-ceramic substrate, a surface roughened coating disposed on at least a portion of an edge surface of the glass or glass-ceramic substrate; and a polymer covering disposed on at least a portion of the surface-roughened coating.

In certain implementations, the surface roughened coating includes a component for mechanically binding with the polymer covering and a component for chemically binding with the glass or glass-ceramic substrate.

The mechanical binding component can include particles or a perforated insert added to at least a surface of the surface-roughened coating. Alternatively or in addition, the mechanical binding component can include texturing in the surface of the surface-roughened coating.

The chemical binding component can include an element or functional group or moiety that forms a chemical bond to the edge surface of the glass or glass-ceramic substrate.

One type of method for making a polymer-covered article can include providing a glass or glass-ceramic substrate, forming a surface-roughened coating on at least a portion of a surface of an edge of the glass or glass-ceramic substrate, and forming a polymer covering on at least a portion of a surface of the surface-roughened coating.

It is to be understood that both the foregoing brief summary and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Exemplary embodiments will now be described in detail. Throughout this description, various components may be identified having specific values or parameters. These items, however, are provided as being exemplary of the present disclosure. Indeed, the exemplary embodiments do not limit the various aspects and concepts, as many comparable parameters, sizes, ranges, and/or values may be implemented. Similarly, the terms "first," "second," "primary," "secondary," "top," "bottom," "distal," "proximal," and the like, do not denote any order, quantity, or importance, but rather are used to distinguish one element from another. Further, the terms "a," "an," and "the" do not denote a limitation of quantity, but rather denote the presence of "at least one" of the referenced item.

Figure 1:
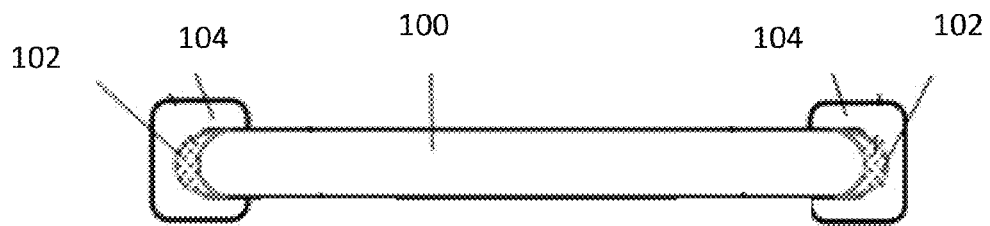
FIG. 1 is an exemplary embodiment of polymer-covered substrate with a surface roughened coating.

Described herein are various polymer-covered glass and glass-ceramic articles that exhibit improved adhesion between the polymer and the glass and glass-ceramic, along with methods for their manufacture and use. The improved articles generally include, as shown for example in FIG. 1, a glass or glass-ceramic substrate 100, a surface-roughened coating 102 disposed on an edge of the glass or glass-ceramic substrate 100, and a polymer covering 104 disposed on the surface-roughened coating 102. The surface-roughened coatings 102 beneficially allow the polymer coverings 104 to adhere better to the edge surfaces of the glass or glass-ceramic substrates 100 relative to similar or identical articles that lack the surface-roughened coating 102.

As stated above, the substrate 100 on which the surface-roughened coating and polymeric covering is disposed can comprise a glass or glass-ceramic material. The choice of glass or glass-ceramic material is not limited to a particular composition, as improved delamination-resistance can be obtained using a variety of glass or glass-ceramic compositions. For example, with respect to glasses, the material chosen can be any of a wide range of silicate, borosilicate, aluminosilicate, or boroaluminosilicate glass compositions, which optionally can comprise one or more alkali and/or alkaline earth modifiers.

By way of illustration, one family of compositions includes those having at least one of aluminum oxide or boron oxide and at least one of an alkali metal oxide or an alkali earth metal oxide, wherein $-15$ mol $\% \le (R_2O+R'O-Al_2O_3-ZrO_2)-B_2O_3 \le 4$ mol %, where R can be Li, Na, K, Rb, and/or Cs, and R' can be Mg, Ca, Sr, and/or Ba. One subset of this family of compositions includes from about 62 mol % to about 70 mol % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. Such glasses are described more fully in U.S. patent application Ser. No. 12/277,573 by Matthew J. Dejneka et al., entitled "Glasses Having Improved Toughness And Scratch Resistance," filed Nov. 25, 2008, published as U.S. Pub. No. 2009/0142568, and claiming priority to U.S. Provisional Patent Application No. 61/004,677, filed on Nov. 29, 2008, the contents of which are incorporated herein by reference in their entireties as if fully set forth below.

Another illustrative family of compositions includes those having at least 50 mol % $SiO_2$ and at least one modifier selected from the group consisting of alkali metal oxides and alkaline earth metal oxides, wherein $[(Al_2O_3 \text{ (mol \%)}+B_2O_3 \text{ (mol \%)})/(\Sigma \text{ alkali metal modifiers (mol \%)})] > 1$. One subset of this family includes from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. Such glasses are described in more fully in U.S. patent application Ser. No. 12/858,490 by Kristen L. Barefoot et al., entitled "Crack And Scratch Resistant Glass and Enclosures Made Therefrom," filed Aug. 18, 2010, issued as U.S. Pat. No. 8,586,492, and claiming priority to U.S. Provisional Patent Application No. 61/235,767, filed on Aug. 21, 2009, the contents of which are incorporated herein by reference in their entireties as if fully set forth below.

Yet another illustrative family of compositions includes those having $SiO_2$, $Al_2O_3$, $P_2O_5$, and at least one alkali metal oxide ($R_2O$), wherein $0.75 \le [(P_2O_5(\text{mol \%})+R_2O(\text{mol \%}))/M_2O_3 \text{ (mol \%)}] \le 1.2$, where $M_2O_3=Al_2O_3+B_2O_3$. One subset of this family of compositions includes from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$. Another subset of this family of compositions includes from about 40 to about 64 mol % $SiO_2$; from 0 mol % to about 8 mol % $B_2O_3$; from about 16 mol % to about 28 mol % $Al_2O_3$; from about 2 mol % to about 12 mol % $P_2O_5$; and from about 12 mol % to about 16 mol % $R_2O$. Such glasses are described more fully in U.S. patent application Ser. No. 13/305,271 by Dana C. Bookbinder et al., entitled "Ion Exchangeable Glass with Deep Compressive Layer and High Damage Threshold," filed Nov. 28, 2011, published as U.S. Pub. No. 2012/0135226, and claiming priority to U.S. Provisional Patent Application No. 61/417,941, filed Nov. 30, 2010, the contents of which are incorporated herein by reference in their entireties as if fully set forth below.

Yet another illustrative family of compositions includes those having at least about 4 mol % $P_2O_5$, wherein $(M_2O_3 \text{ (mol \%)}/R_xO(\text{mol \%})) < 1$, wherein $M_2O_3=Al_2O_3+B_2O_3$, and wherein $R_xO$ is the sum of monovalent and divalent cation oxides present in the glass. The monovalent and divalent cation oxides can be selected from the group consisting of $Li_2O$, $Na_2O$, $K_2O$, $Rb_2O$, $Cs_2O$, MgO, CaO, SrO, BaO, and ZnO. One subset of this family of compositions includes glasses having 0 mol % $B_2O_3$. Such glasses are more fully described in U.S. Provisional Patent Application No. 61/560,434 by Timothy M. Gross, entitled "Ion Exchangeable Glass with High Crack Initiation Threshold," filed Nov. 16, 2011, to which U.S. Pat. No. 8,765,262 claims priority, the contents of which are incorporated herein by reference in their entireties as if fully set forth below.

Still another illustrative family of compositions includes those having $Al_2O_3$, $B_2O_3$, alkali metal oxides, and contains boron cations having three-fold coordination. When ion exchanged, these glasses can have a Vickers crack initiation threshold of at least about 30 kilograms force (kgf). One subset of this family of compositions includes at least about 50 mol % $SiO_2$; at least about 10 mol % $R_2O$, wherein $R_2O$ comprises $Na_2O$; $Al_2O_3$, wherein $-0.5$ mol % $\le Al_2O_3(\text{mol \%})-R_2O(\text{mol \%}) \le 2$ mol %; and $B_2O_3$, and wherein $B_2O_3 \text{ (mol \%)}-(R_2O(\text{mol \%})-Al_2O_3(\text{mol \%})) \ge 4.5$ mol %. Another subset of this family of compositions includes at least about 50 mol % $SiO_2$, from about 9 mol % to about 22 mol % $Al_2O_3$; from about 4.5 mol % to about 10 mol % $B_2O_3$; from about 10 mol % to about 20 mol % $Na_2O$; from 0 mol % to about 5 mol % $1K_2O$; at least about 0.1 mol % MgO and/or ZnO, wherein $0 \le MgO+ZnO \le 6$ mol %; and, optionally, at least one of CaO, BaO, and SrO, wherein 0 mol % $\le CaO+SrO+BaO \le 2$ mol %. Such glasses are more fully described in U.S. Provisional Patent Application No. 61/653,485 by Matthew J. Dejneka et al., entitled "Ion Exchangeable Glass with High Damage Resistance," filed May 31, 2012, to which U.S. application Ser. No. 13/903,398, published as U.S. Pub. No. 2014/0106172, claims priority the contents of which are incorporated herein by reference in their entireties as if fully set forth below.

Similarly, with respect to glass-ceramics, the material chosen can be any of a wide range of materials having both a glassy phase and a ceramic phase. Illustrative glass-ceramics include those materials where the glass phase is formed from a silicate, borosilicate, aluminosilicate, or boroaluminosilicate, and the ceramic phase is formed from β-spodumene, β-quartz, nepheline, kalsilite, or carnegieite.

The glass or glass-ceramic substrate can adopt a variety of physical forms. That is, from a cross-sectional perspective, the substrate can be flat or planar, or it can be curved and/or sharply-bent. Similarly, it can be a single unitary object, or a multi-layered structure or laminate. Further, the substrate optionally can be annealed and/or strengthened (e.g., by thermal tempering, chemical ion-exchange, or like processes).

The surface-roughened coating 102, which is disposed, either directly or indirectly, on at least a portion of an edge or minor surface of the substrate, can be formed from a variety of materials, termed "coating precursor materials" herein for convenience only. The surface-roughened coating generally includes a component for mechanically binding with the polymer covering and a component for chemically binding with the substrate. The mechanical binding component generally can be created by introducing an additive (e.g., particles, pins, a perforated insert, or the like) to at least the surface of the surface-roughened coating or it can be created by texturing (e.g., by mechanical or chemical means) the surface of the surface-roughened coating. The chemical binding component can be any element or functional group or moiety that has a strong affinity for the surface of the glass or glass-ceramic substrate. For example, the chemical binding component can be a Si—O bond-forming inorganic polymer (e.g., a silane, siloxane, silsesquioxane, or the like), an oxide material, an organic polymer (e.g., an acrylate, an epoxy, a urethane, or the like) or combinations thereof.

Figure 2A:
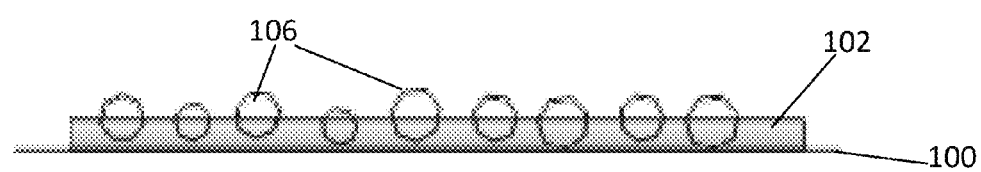
FIG. 2A is an exemplary embodiment of the surface roughened coating having particulates.

When the mechanical binding component is created by means of an additive, in most implementations, the additive will be any of a number of particles having regular or irregular shapes, as shown for example in FIG. 2A. Examples of such particles 106 include spherical, ovular, filament-like, fibrous, and/or helical oxides, polymers, minerals, clays, or the like. In certain situations, the particles can be treated in a manner to provide a means for chemical binding with the polymer covering. Particulate additives can be beneficial because they allow for a reduced mismatch between the coefficient of thermal expansion (CTE) between the glass or glass-ceramic and the polymer used to form the covering. That is, proper selection of the materials used for the particulate additive and the coating precursor material can lead to the formation of a functional gradient in the CTE of the surface-roughened coating so as to minimize the CTE mismatch between the substrate and the polymer of the covering.

Figure 2B:
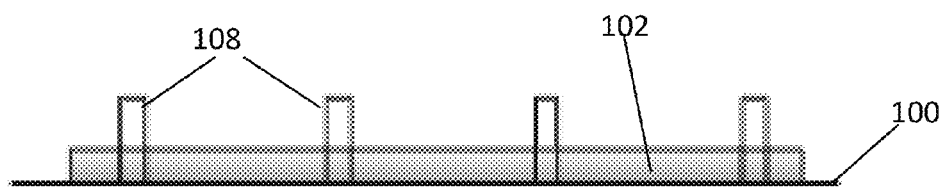
FIG. 2B is an exemplary embodiment of the surface roughened coating having pins.
Figure 2C:
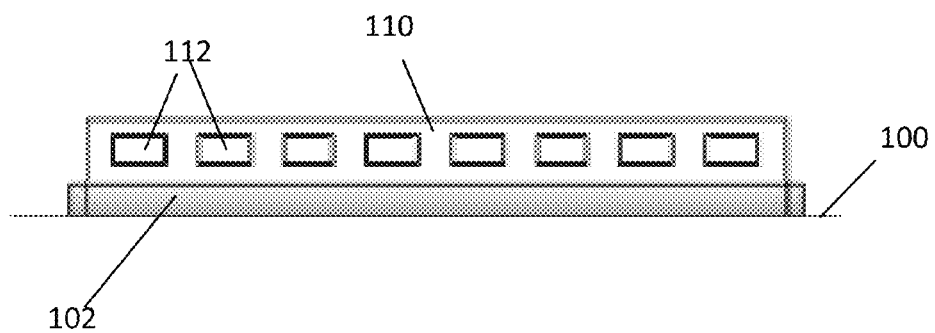
FIG. 2C is an exemplary embodiment of the surface roughened coating having a perforated insert.

In other implementations where the mechanical binding component is created by means of an additive, the additive can be a plurality of pin-shaped elements 108, such as glass, ceramic, wood, plastic, metal, or the like, as shown for example in FIG. 2B. In other embodiments, the additive can be an insert 110 having a plurality of perforations 112, as shown for example in FIG. 2C, such as those used in existing metal insert molding processes. That is, a perforated insert, which can be formed from a metal or other material, can be incorporated into the coating precursor material so as to partially protrude from the surface of the final surface-roughened coating.

Exemplary coating precursor materials that can be used to form the surface-roughened coating include silanes, siloxanes, silsesquioxanes, oxides, acrylates, epoxies, urethanes, and the like.

The polymer covering 104, which is disposed, either directly or indirectly, on at least a portion of the surface-roughened coating, can be formed from a variety of polymeric materials, including urethanes, thermoplastic elastomers, polycarbonates, acrylonitrile butadiene styrene polymers (ABS), or the like, or mixtures or copolymers thereof.

Methods of making the above-described articles generally include the steps of providing a glass or glass-ceramic substrate, forming the surface-roughened coating on at least a portion of a surface of an edge of the substrate, and forming the polymer covering on at least a portion of a surface of the surface-roughened coating. It should be noted that the surface fraction of the edge of the substrate that is covered by the surface-roughened coating does not have to be the same as the surface fraction covered by the polymer covering.

The selection of materials used in the glass or glass-ceramic substrates, surface-roughened coating, and polymer covering can be made based on the particular application desired for the final article. In general, however, the specific materials will be chosen from those described above for the covered articles.

Provision of the substrate can involve selection of a glass or glass-ceramic object as-manufactured, or it can entail subjecting the as-manufactured glass or glass-ceramic object to a treatment in preparation for forming the surface-roughened coating. Examples of such pre-coating treatments include physical or chemical cleaning, physical or chemical strengthening, physical or chemical etching, physical or chemical polishing, annealing, shaping, and/or the like. Such processes are known to those skilled in the art to which this disclosure pertains.

Once the glass or glass-ceramic substrate has been selected and/or prepared, the surface-roughened coating can be formed on at least an edge surface thereof. Depending on the materials chosen, the surface-roughened coating can be formed using a variety of techniques. It is important to note that the surface-roughened coating is not a free-standing film that can be applied (e.g., via an adhesive or other fastening means) to the surface of the substrate, but is, in fact, physically formed on the surface of the substrate.

In general, the surface-roughened coating can be fabricated independently using any of the variants of chemical vapor deposition (CVD) (e.g., plasma-enhanced CVD, aerosol-assisted CVD, metal organic CVD, and the like), any of the variants of physical vapor deposition (PVD) (e.g., ion-assisted PVD, pulsed laser deposition, cathodic arc deposition, sputtering, and the like), spray coating, spin-coating, dip-coating, inkjetting, sol-gel processing, injection molding, or the like. Such processes are known to those skilled in the art to which this disclosure pertains.

In many implementations, the surface-roughened coating precursor materials may need to undergo an additional treatment step to finalize this layer. By way of example, in cases when the surface-roughened coating precursor material is applied to the substrate in liquid form, it can undergo a thermal, oxidation, moisture, or radiation treatment to form the final coating.

After the coating or coating precursor material has been formed on the substrate, the surface of the coating must be roughened. This can be accomplished by incorporating an additive prior to exposing the liquid surface-roughened coating precursor material to the treatment step to form the final coating. Alternatively, this can be accomplished by texturing the surface of the coating or coating precursor material.

Once the surface-roughened coating is formed, the polymer covering can be formed on at least a portion of a surface of the surface-roughened coating. The polymer covering can be formed by spray coating, spin-coating, dip-coating, inkjetting, sol-gel processing, injection molding, or the like. In most implementations, however, the polymer covering will be formed by an injection molding process. In some embodiments, the force needed to break the adhesion between the polymer covering and the substrate, as measured by a tensile tester (e.g., an Instron Model 4202 Tensile Tester with 50 Kg loadcell) 5 days after applying the polymer covering is at least about 200N, at least about 225N, at least about 250N, at least about 275N, at least about 300 N, at least about 325N, at least about 350N, at least about 375N, or at least about 400N.

Once the polymer-covered article is formed, it can be used in a variety of applications. These applications encompass touch-sensitive display screens or cover plates for various electronic devices (e.g., cellular phones, personal data assistants, computers, tablets, global positioning system navigation devices, and the like), non-touch-sensitive components of electronic devices, surfaces of household appliances (e.g., refrigerators, microwave ovens, stovetops, oven, dishwashers, washers, dryers, and the like), and vehicle components, just to name a few devices.

EXAMPLES

Various embodiments will be further clarified by the following examples.

Example 1

The liquid UV curable coating composition of Table 1 was applied to the edge of 2¼"×4⅛"×1 mm thick 2318 glass slides by using a hand dip coating method. A 3 mil Bird applicator was used to draw down 0.003" thick liquid coating onto a ¹⁄₁₆" thick sheet of Plexiglass plastic. Then, the slides were held vertical and their edge dipped into the 0.003" thick liquid coating film. The glass slides were rotated while in contact with the 0.003" thick liquid coating film to apply the liquid coating around the entire perimeter of the slide. The edge geometry of the glass was 225 μm, 45° chamfers on each side with entire edge ground with 600 grit to an $R_A$=1.670 μm.

TABLE 1

Coating Composition

| Percent by weight | Ingredient | Ingredient description |
|---|---|---|
| 70.69 | Nanopox C-620 | Cycloaliphatic epoxy resin with 40% by weight 20 nm spherical nanosilica |
| 23.56 | Nanopox C-680 | Oxetane monomer with 50% by weight 20 nm spherical nanosilica |
| 3 | Coatosil MP-200 | Silane adhesion promoter |
| 2.5 | Cyracure UVI-6976 | Cationic photoinitiator |
| 0.25 | Tinuvin 292 | Hindered amine light stabilizer |

Three types of powder particulate material were applied to the liquid coating material on the edge of the slide to form a roughened coating by sprinkling from a scoopula while the slide is held vertical and slowly rotated. The powder particulate materials were polylactic acid available as Encorene PLA NW 4020 from Icopolymers, Inc., cristobalite available as Cristol Brite KRS from CED Minerals Inc., and 100 μm nylon powder available as Rilsan T NAT BHV from Arkema Inc. The liquid coating was then UV cured to a solid by placing it on a 1 cm thick Teflon block on a stainless steel tray and passed through a Fusion Systems 500 W/in D lamp UV conveyor system at 2 ft/min. The sample was then flipped over and passed through the UV system again. The glass samples were then overmolded with PCABS polymer (SABIC Innovative Plastics Cycoloy C1000HFPC+ABS). The adhesion of the PCABS polymer to the glass was measured on an Instron Model 4202 Tensile Tester with 50 Kg loadcell. Table 2 shows the peak load adhesion force measurements immediately after overmolding.

TABLE 2

Adhesion Force Measurements Immediately Following Overmolding

| No Coating | Coating Only | Coating + Encorene PLA NW 4020 | Coating + Cristol Brite KRS | Coating + Rilsan T NAT BHV |
|---|---|---|---|---|
| 117.6N | 220.7N | 322.3N | 212.5N | 201.0N |

The adhesion was higher for all edge coated samples with and without added surface particles. Table 3 shows the peak load adhesion force measurements made 5 days after UV cure and overmolding for 5 samples.

TABLE 3

Adhesion Force Measurements 5 Days After Overmolding

| No Coating | Coating Only | Coating + Encorene PLA NW 4020 | Cristol Brite KRS |
|---|---|---|---|
| 0N | 133N | 274N | 267N |
| 0N | 0N | 380N | 239N |
| 6N | 17N | 456N | 104N |
| 0N | 0N | 513N | 437N |
| 0N | 0N | 428N | 513N |

Table 3 shows the distinct drop off in adhesion of the non-coated and the coated-but-no-added-surface-particles samples. In many of these samples, the adhesion drops to zero. However, the samples with the surface particles added have distinctly higher adhesion.

Example 2

Samples of glass measuring 56.45 mm×104.8 mm×0.7 mm were edge coated with the same coating composition as from Example 1. Three powders sieved with a 70 mesh (210 μm) sieve were applied to the wet surface of the edge coating by sprinkling. The three powders were PCABS (polycarbonate acrylonitrile butadiene styrene) Cycoloy C1000F from Sabic Innovative Plastics, PLA (polylactic acid) Encorene PLA NW4020 from ICO Polymers Inc, and a thermoset phenolic (Pheno Seal Super Fine) from Forta Corp. The samples were UV cured by placing them on their side on top of 1 cm thick Teflon blocks under a Dymax Model 2000 Flood Cure UV system at 3⅜" distance for 5 minutes. The samples were then thermally postcured at 150° C. for 25 minutes. The samples were then overmolded with two different plastics (PC-ABS with 50% glass fiber and PC-ABS with 20% carbon fiber). The parts came out intact with no warp. The adhesion between the glass and overmolded plastic was so high that in some samples glass broke when performing a mechanical three point bend testing according to the procedure outlined in ASTM C158-02 (2012), except that the glass samples were the dimensions specified above rather than the dimensions suggested in ASTM C158-02(2012). All overmolded plastic samples adhered to a glass substrate with a surface roughened coating showed a 5× improvement in resistance to delamination versus a control sample where the plastics were overmolded directly on to the glass substrate that was not coated with a surface roughened coating.

While the embodiments disclosed herein have been set forth for the purpose of illustration, the foregoing description should not be deemed to be a limitation on the scope of the disclosure or the appended claims. Accordingly, various modifications, adaptations, and alternatives may occur to one skilled in the art without departing from the spirit and scope of the present disclosure or the appended claims.

What is claimed is:

1. A polymer-covered article, comprising:
   a glass or glass-ceramic substrate;
   a surface roughened coating having first and second surfaces, wherein the first surface is disposed on at least a portion of an edge surface of the glass or glass-ceramic substrate and the second surface of the coating is roughened; and
   a polymer covering disposed on at least a portion of the second surface of the surface-roughened coating,
   wherein the surface roughened coating comprises a component for mechanically binding with the polymer covering and a component for chemically binding with the glass or glass-ceramic substrate, and
   wherein the mechanical binding component comprises particles added to, and exposed on, at least the second surface of the surface-roughened coating.

2. A polymer-covered article, comprising:
   a glass or glass-ceramic substrate;
   a surface roughened coating having first and second surfaces, wherein the first surface is disposed on at least a portion of an edge surface of the glass or glass-ceramic substrate and the second surface of the coating is roughened; and
   a polymer covering disposed on at least a portion of the second surface of the surface-roughened coating,
   wherein the surface roughened coating comprises a component for mechanically binding with the polymer covering and a component for chemically binding with the glass or glass-ceramic substrate, and
   wherein the mechanical binding component comprises a perforated insert added to at least the second surface of the surface-roughened coating.

3. The polymer-covered article of claim 1 or 2, wherein the mechanical binding component further comprises texturing in the second surface of the surface-roughened coating.

4. The polymer-covered article of claim 1 or 2, wherein the chemical binding component comprises an element or functional group or moiety that forms a chemical bond to the edge surface of the glass or glass-ceramic substrate.

5. The polymer-covered article of claim 4, wherein the chemical binding component is selected from the group consisting of silanes, siloxanes, silsesquioxanes, oxides, acrylates, epoxies, and urethanes.

6. The polymer-covered article of claim 1 or 2, wherein the mechanical binding component reduces the coefficient of thermal expansion mismatch between the substrate and the polymer covering.

7. The polymer-covered article of claim 1 or 2, wherein the force needed to break the adhesion between the polymer covering and the substrate is at least 200 N as measured by a tensile tester 5 days after application of the polymer coating.

8. The polymer-covered article of claim 1 or 2, wherein the force needed to break the adhesion between the polymer covering and the substrate is at least 300 N as measured by a tensile tester 5 days after application of the polymer coating.

9. A method of making a polymer-covered article, the method comprising:
   forming a surface-roughened coating having first and second surfaces, wherein the first surface of the coating is disposed on at least a portion of a surface of an edge of a glass or glass-ceramic substrate and the second surface of the coating is roughened; and
   forming a polymer covering on at least a portion of the second surface of the surface-roughened coating,
   wherein the surface roughened coating comprises a component for mechanically binding with the polymer covering and a component for chemically binding with the glass or glass-ceramic substrate, and
   wherein the mechanical binding component comprises particles added to, and exposed on, at least the second surface of the surface-roughened coating.

10. A method of making a polymer-covered article, the method comprising:
    forming a surface-roughened coating having first and second surfaces, wherein the first surface of the coating is disposed on at least a portion of a surface of an edge of a glass or glass-ceramic substrate and the second surface of the coating is roughened; and
    forming a polymer covering on at least a portion of the second surface of the surface-roughened coating,
    wherein the surface roughened coating comprises a component for mechanically binding with the polymer covering and a component for chemically binding with the glass or glass-ceramic substrate, and
    wherein the mechanical binding component comprises a perforated insert added to at least the second surface of the surface-roughened coating.

11. The method of claim 9 or 10, wherein the mechanical binding component further comprises texturing in the second surface of the surface-roughened coating.

12. The method of claim 9 or 10, wherein the chemical binding component comprises an element or functional group or moiety that forms a chemical bond to the edge surface of the glass or glass-ceramic substrate.

13. The method of claim 9 or 10, wherein the chemical binding component is selected from the group consisting of silanes, siloxanes, silsesquioxanes, oxides, acrylates, epoxies, and urethanes.

14. The method of claim 9 or 10, wherein the mechanical binding component reduces the coefficient of thermal expansion mismatch between the substrate and the polymer covering.

15. The method of claim 9 or 10, wherein the force needed to break the adhesion between the polymer covering and the substrate is at least 200 N as measured by a tensile tester 5 days after application of the polymer coating.

16. The method of claim 9 or 10, wherein the force needed to break the adhesion between the polymer covering and the substrate is at least 300 N as measured by a tensile tester 5 days after application of the polymer coating.

* * * * *